United States Patent Office.

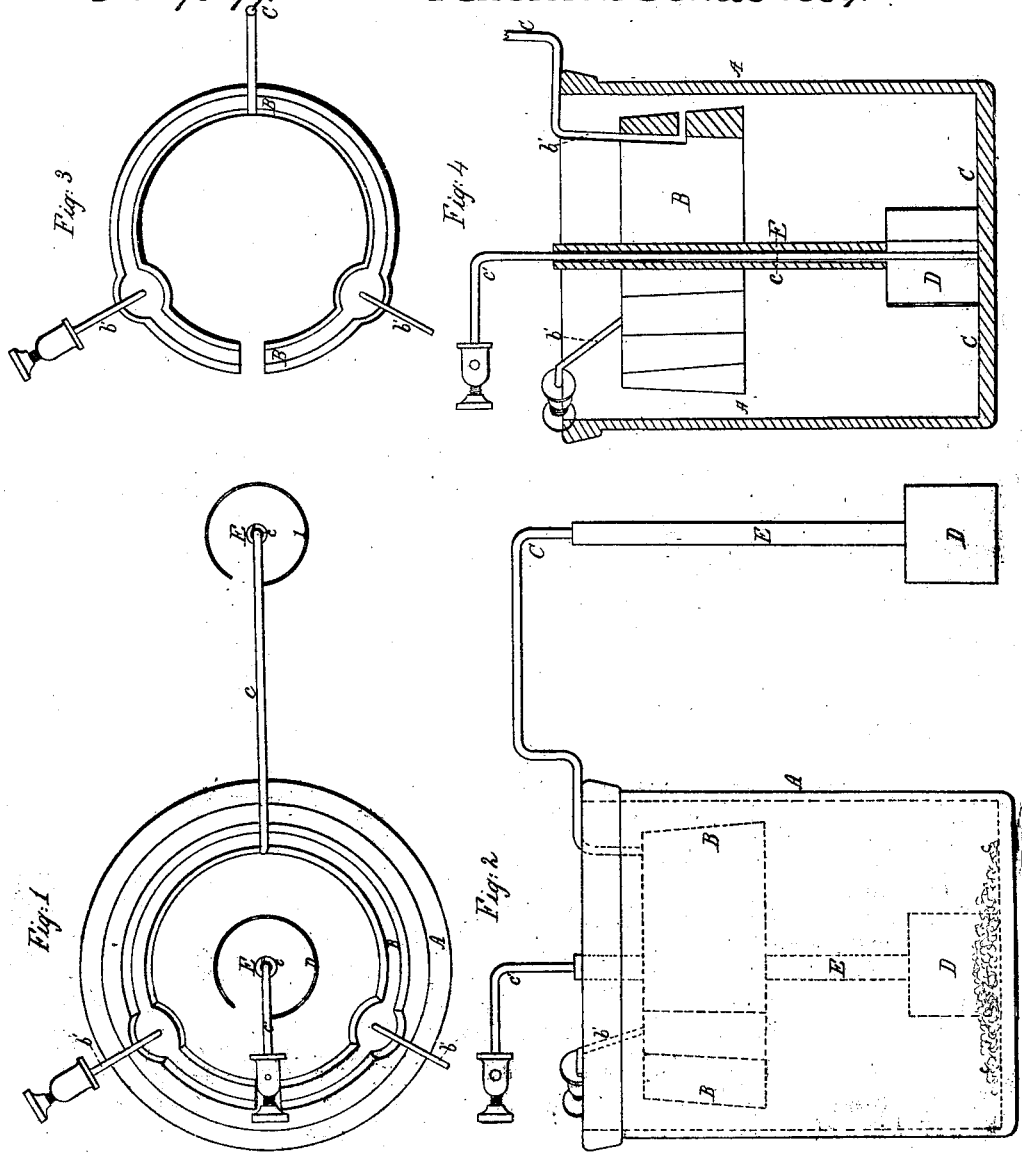

JEAN ARMAND CALLAUD, OF NANTES, FRANCE.

Letters Patent No. 96,199, dated October 26, 1869; patented in France, May 19, 1858.

IMPROVED GALVANIC BATTERY.

The Schedule referred to in these Letters Patent and making part of the same.

*To all whom it may concern:*

Be it known that I, JEAN ARMAND CALLAUD, of the city of Nantes, in the Empire of France, have invented a useful Improvement in the Galvanic Pile or Battery; and I do hereby declare the following to be a true, full, and exact description of the same, reference being had to the accompanying drawings, making a part of this specification.

The nature of my invention consists in providing a battery of such form and proportions of the materials used, as to operate in the most rapid manner, having the parts so constructed as to be easily supplemented when desired, and not liable to be disarranged by the ordinary uses of the same.

Figures 1, 2, 3, and 4, represent the different parts of this, my invention, in which—

A represents an exterior cup, of glass or analogous material, four and three-quarters inches in height, and four inches in diameter.

B is the zinc plate used, and placed vertically within said cup, and one and one-quarter inch in height, three inches in diameter, and three-eighths of an inch thick, and presenting twenty-two and one-half inches of surface to the fluid contained within the cup. This zinc can be made of sheet-metal or cast. When made of the latter, it is made thicker at the base, so as to enable it to be easily drawn from the mould, and to present the greatest surface when the metal is most exposed to the dissolving-solution.

In the sheet-zinc, two copper hooks, $b'\ b'$, are riveted and soldered. In the cast-zinc, similar hooks are placed in the mould, and the metal poured around them, by which hooks the zinc is suspended from the glass in the solution.

The copper rod $c$ is also soldered or cast to or upon the zinc referred to, extending over the glass jar on which it rests, and curved downward into the next jar, in the manner shown in fig. 2.

This rod $c$ is covered by a rubber tube, E, to the extent of its length that is exposed to the solution, to prevent the precipitation of the copper.

To the end of this rod $c$, a sheet of copper, D, is attached, and wound spirally around its centre. These copper rods exposed to the air, are turned, to prevent the action of the salts upon them, and the copper hooks $b'\ b'$ are painted.

The rubber tube E, covering the rods $c$, is firmly and securely tied or bound, at either end, to the rod.

To prepare this battery for action, from one to two ounces of sulphate of copper are put into the glass, and enough water poured in to immerse the zinc. If an immediate current is desired, add to the water a small quantity of sulphate of zinc, or rock-salt, or a few drops of sulphuric acid.

If it is desired to start the battery with a prepared solution of copper, first fill the jars with pure water to the height of the lower part of the suspended zinc, and through a funnel, the lower end of which reaches to the bottom of the glass, and pour in the solution of copper, which, from its greater density, will cause the pure water to rise above it, itself remaining at the bottom of the glass.

A battery arranged in this way will work as long as the zinc lasts, and as long as the liquid is saturated with the sulphate of copper. This saturation is easily maintained by dropping, from time to time, some crystals and sulphate of copper into the jar, which, by gradually dissolving, keeps the liquid constantly saturated.

What I claim as my invention, and desire to secure by Letters Patent, is—

1. The combination and arrangement of the jar A, zinc B, hooks $b'\ b'$, rod $c$, rubber tubing E, and sheet-copper D, in the manner and for the purpose herein described.

2. The combination and arrangement of the devices above mentioned, in the form and proportions herein described.

This specification signed by me, this 14th day of January, 1869.

JEAN ARMAND CALLAUD.

Witnesses:
A. BICQUET,
N. LEBLEUFILS.